US007188102B1

(12) United States Patent
Gollapudi et al.

(10) Patent No.: US 7,188,102 B1
(45) Date of Patent: Mar. 6, 2007

(54) METHOD AND APPARATUS FOR EFFICIENT TRANSMISSION OF RESULT SET DATA

(75) Inventors: Sreenivas Gollapudi, Cupertino, CA (US); Jonathan Klein, Emerald Hills, CA (US); Chi Ku, San Ramon, CA (US)

(73) Assignee: Oracle International Corp., Redwood Shores, CA (US)

( * ) Notice: Subject to any disclaimer, the term of this patent is extended or adjusted under 35 U.S.C. 154(b) by 510 days.

(21) Appl. No.: 10/658,724

(22) Filed: Sep. 9, 2003

(51) Int. Cl.
*G06F 17/30* (2006.01)
(52) U.S. Cl. ............... 707/3; 707/1; 707/5; 707/103 R
(58) Field of Classification Search .................. 707/1, 707/3, 5, 103 R
See application file for complete search history.

(56) References Cited

U.S. PATENT DOCUMENTS 6,112,197 A * 8/2000 Chatterjee et al. ............. 707/3

OTHER PUBLICATIONS

Gokul Soundarajan and Christina Amza, "Using Semantic Information to Improve Transparent Query Caching for Dynamic Content Web Sites", 1999, pp. 1-7.*

* cited by examiner

*Primary Examiner*—Apu Mofiz
*Assistant Examiner*—Farhan M. Syed
(74) *Attorney, Agent, or Firm*—Park, Vaughan & Fleming, LLP

(57) ABSTRACT

A method and apparatus for efficiently transmitting a result set. A data server receives a data request from a client or another server. The data server determines whether a threshold portion of the contents of each requested row or record is being retrieved (e.g., X% of the number of columns in a table or X% of the total amount of data in a table row). The requested rows are retrieved in the same format in which they are stored (e.g., within a disk block), and streamed to the client, one row at a time. The client is then responsible for disassembling a row into its columns, reordering them if necessary, and performing any necessary post-processing (e.g., datatype conversion, data formatting) before consuming the data.

22 Claims, 2 Drawing Sheets

METHOD AND APPARATUS FOR EFFICIENT TRANSMISSION OF RESULT SET DATA

BACKGROUND

This invention relates generally to the field of data communications. More particularly, a method and apparatus are provided for transporting data from a data server.

A data server (e.g., a database, an origin server) is configured to serve data to clients and other servers. For example, a data server may receive a query from a client (e.g., a SELECT statement), retrieve data that satisfy the query from disk or other storage, and serve the data to the client. The data may comprise any number of rows, or records, and each row may contain any number of columns, or attributes.

Traditionally, such data (e.g., a row set, a result set) is shipped from the data server one row at a time. However, before transmission, each row or column is usually decomposed into its constituent columns, which may be processed to convert data types, apply business logic, retrieve related data, format a column's data, etc. For wide rows (e.g., rows having tens or hundreds of columns), a significant amount of time may be expended performing the processing on the server prior to its transmission. And, in some cases, the client may be configured or configurable to perform the same processing.

At the client or other recipient, data are received one row at a time, and may be broken down into individual columns and consumed as needed for the controlling application or utility. The data may thus be disassembled twice—once at the server and once at the client—before being consumed. For simple data (e.g., those requiring little or no processing on the data server), two disassembly operations may be superfluous.

SUMMARY

In one embodiment of the invention, a method and apparatus are provided for efficiently transmitting a result set. A data server receives a data request from a client or another server. The data server determines whether a threshold portion of the contents of each requested row or record is being retrieved (e.g., X% of the number of columns in a table or X% of the total amount of data in a table row). The requested rows are retrieved in the same format in which they are stored (e.g., within a disk block), and streamed to the client, one row at a time. The client is then responsible for disassembling a row into its columns, reordering them if necessary, and performing any necessary post-processing (e.g., datatype conversion, data formatting) before consuming the data.

The server may inform the data requestor of the storage format of the data each time a data request is received, when a session is established between the requestor and the server, or at some other time.

If a result set requires post-processing that is too complex for the client or, possibly, if the amount of data requested is less than the applicable threshold, the server may disassemble the requested rows, reorder them as necessary and perform the post-processing before transmitting the result set to the client.

DETAILED DESCRIPTION

Figure 1:
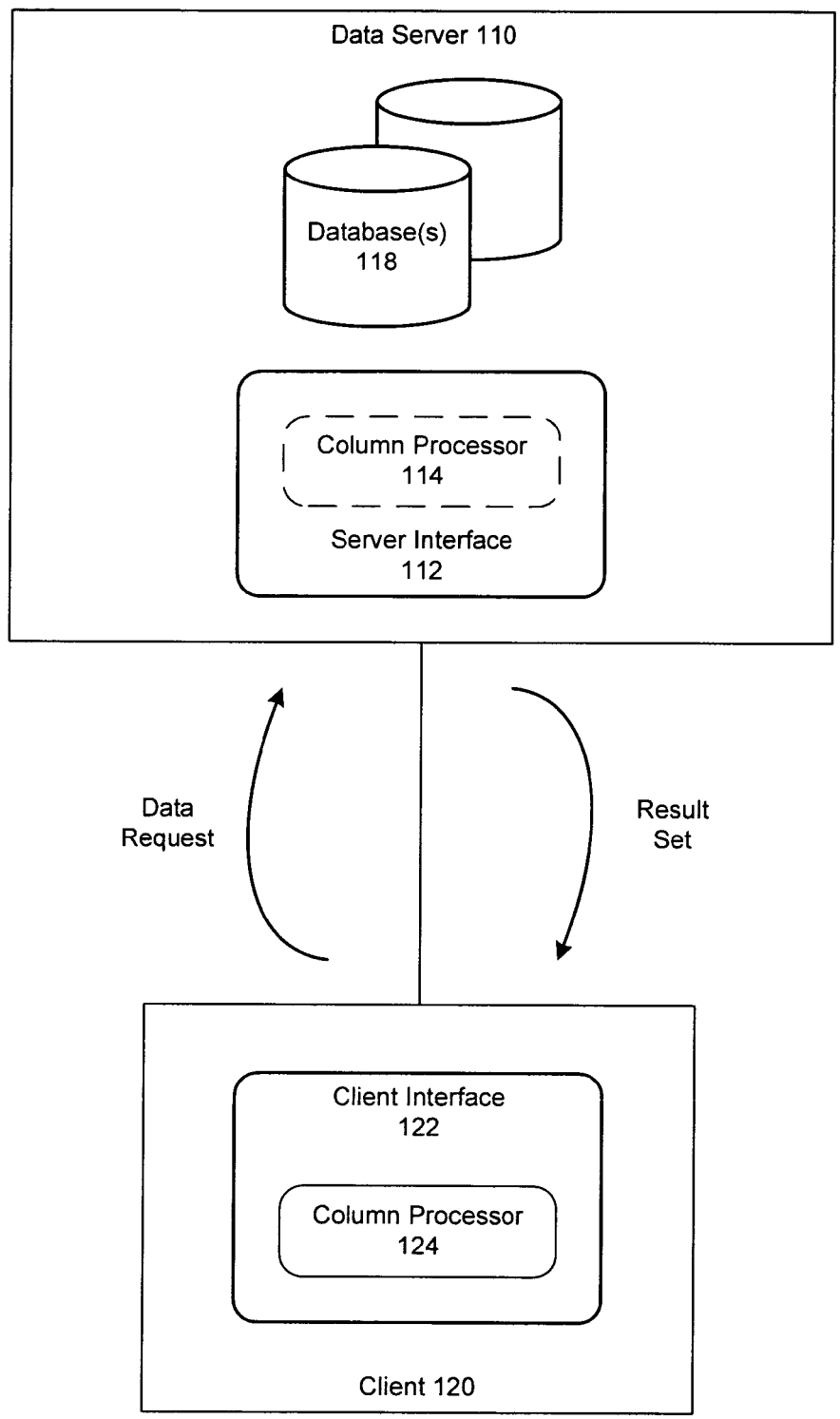
FIG. 1 depicts a computing environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a data server, a general-purpose computer or a special purpose device such as a hand-held computer. Details of such devices (e.g., processor, memory, data storage, display, communication interface) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

In one embodiment of the invention, a method and apparatus are provided for transporting data (e.g., a row set, a result set) more efficiently from a data server or other source. Illustratively, the data to be transported may reside in a database such as an Oracle Database by Oracle Corporation.

In this embodiment, data are shipped from the server to a client or other recipient, such as another server, in substantially the same form in which it was stored on disk or other storage device. For example, the data may be transmitted one row at a time, but will be transmitted as retrieved from storage, without being broken into columns and subjected to per-column processing.

So that the client can unmarshal the data, the server informs the client of the configuration of the disk block, or other format, in which the data are stored. Upon receipt of the data, the client is able to extract the data and process it as needed. Because processing of the data is moved from the server, a significant decrease can be achieved in the number of instructions that must be executed on the server in order to serve the data.

To facilitate implementation of the invention, the client may be configured with an interface, such as Oracle Call Interface (OCI), that is tightly coupled to the database or data source maintained on the server. Many interfaces, such as Java Database Connectivity (JDBC), Open Database Connectivity (ODBC) and Command Line Interface (CLI) are more generic client interfaces, but may be modified to include the functionality described herein.

FIG. 1 depicts an environment in which an illustrative embodiment of the invention may be implemented. In this embodiment, server 110 is coupled to client 120 by a communication link, which may be wired or wireless and may comprise a network, point-to-point link or other connection.

Server 110 is a database server, origin server, web server or other computer server configured to serve data in response to requests from any sources (e.g., clients, other servers). Client 110 is a computer system (e.g., handheld, desktop, mobile) or other device equipped with a processor and software or firmware for requesting and processing data from server 110.

Server 110 includes server interface 112 for receiving data requests and sending result sets in response to requests. Server 110 also includes one or more databases, datasets or other data compilations 118 comprising data to be served or transmitted to clients, servers and/or other entities.

Client 120 includes client interface 122, which is configured to communicate with server interface 112 to request and receive data from server 110. Client interface 122 includes column (or field) processor or processing module 124, which is configured to apply per-column processing to some or all columns or fields of database rows or records received from the server. In this embodiment of the invention, server 110 may perform per-column processing in some cases; therefore, server interface 112 may include column processor 114. The client interface may be OCI (Oracle Call Interface), by Oracle Corporation.

Data requests may be submitted to server 110 from client 120, and other sources, in any format understood by server interface 112 (e.g., as SQL statements, queries). As described herein, a result set for a request may be returned in substantially the same format as it is received or retrieved from database 118.

In an embodiment of the invention, the selectivity of a query or request submitted to the data server may be defined as the ratio between the number of columns in the select list and the number of columns in the database table to which the query is applied. Or, the selectivity may be defined as the ratio between the amount of data in the columns of the select list (e.g., cumulative size of all selected columns) and the total amount of data in a row of the table (e.g., total size of all columns).

If the selectivity of the query is relatively low (e.g., less than 50%, less than 80%), the result set of the query may be processed traditionally—with disassembly of rows and per-column processing being performed on the server. If the selectivity is relatively high, then the result set may be sent to the client as described herein—without being disassembled on the server, without being subjected to per-column processing on the server and in basically the same format in which the data were stored. In another embodiment of the invention, most or all result sets may be transmitted as described herein.

In an embodiment of the invention, when the server transmits a result set in the form in which it was stored, without being disassembled and processed on the server, entire rows or records are sent. In other words, all columns or attributes in each selected row are sent, even if only a subset of all columns were selected.

Another embodiment of the invention is applied only when a data request targets "real" columns in a data table, not pseudo-columns. A real column is a column that is stored as part of the table. A pseudo-column is generated by applying a function or other processing to one or more real columns. Pseudo-columns are not stored with the table. As one exception, however, data requests may employ or identify data by row id, a special pseudo-column that does not need to be computed from a row's real columns.

To enable implementation of an embodiment of the invention, clients, servers and other entities that request data from a server are informed of the disk row format, or other storage format, of data stored on the server. For example, rows in a database table may be stored as a contiguous set of the row's column values. For each row of the table, the columns are generally stored in the same order.

When a data request is received, one or more responsive rows are identified and retrieved. Instead of reordering the rows as specified in the request, however, the rows are transmitted in the order and form in which they are retrieved from storage. The requestor is responsible for disassembling each row as it is received, reordering the columns as needed and performing any post-processing (e.g., to convert a data type, to apply a desired presentation format).

Figure 2:
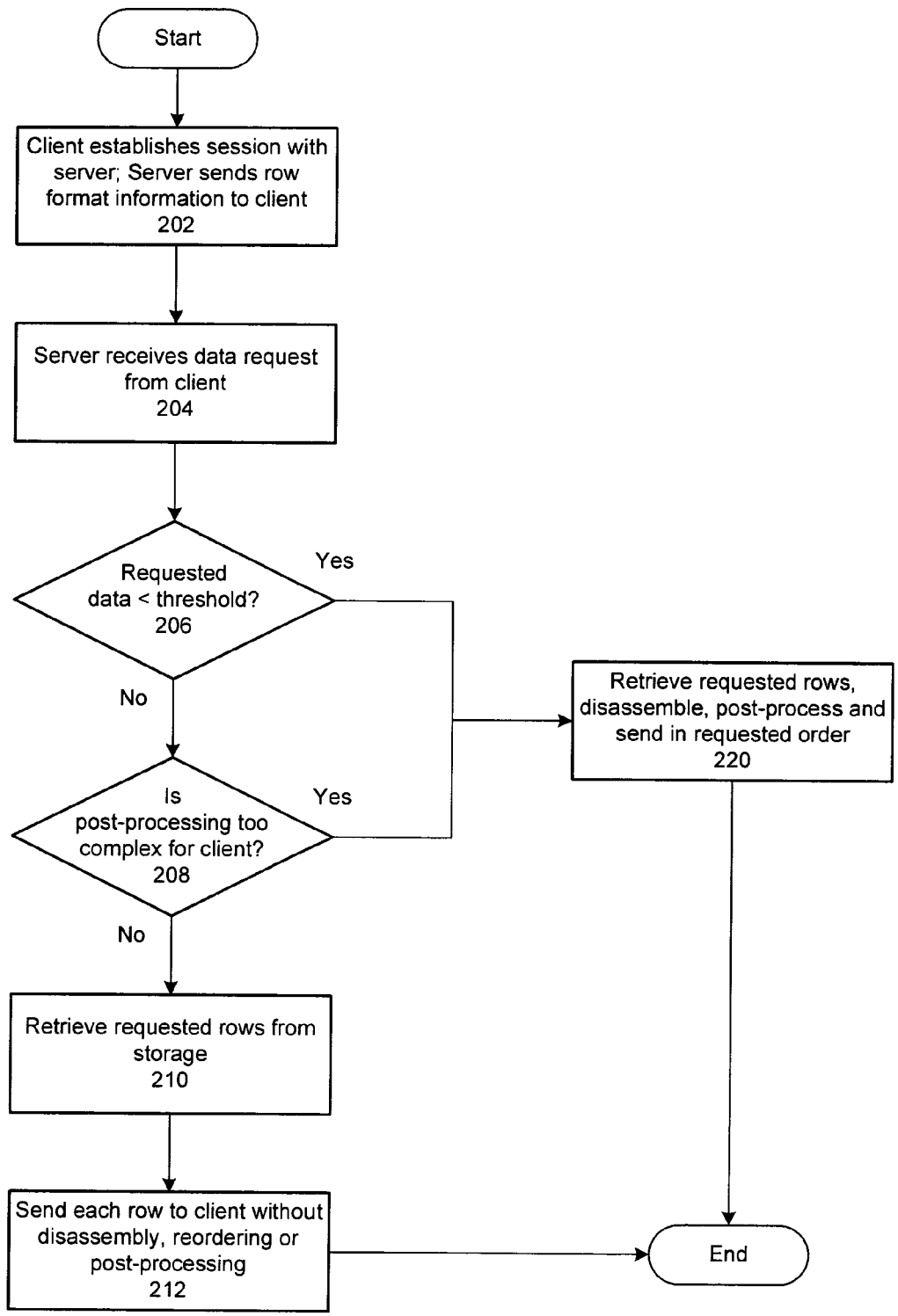
FIG. 2 is a flowchart illustrating one method of efficiently transmitting a result set from a data server to a client, in accordance with an embodiment of the invention.

FIG. 2 demonstrates a method of efficiently transmitting data from a data server, according to one embodiment of the invention. In this embodiment, a data request is received as a query from a client, but the embodiment is compatible with multiple data request types and formats and can receive them from other servers as well as clients.

Applying this embodiment of the invention reduces the code path in the server and reduces the server's overall response time to a data request.

In state 202, a client establishes a session with a data server that stores data needed by the client. The server may employ any type or types of storage devices, such as disk, tape, etc. As part of the process of establishing a session, the server informs the client of the row format for the database table(s) the client will access on the server. Illustratively, the format of a table may be sent as a sequence of tuples having the form <size, data>, where size is the size of a column (or attribute or field) and data is the datatype of the column.

In one alternative embodiment of the invention, the server notifies a client of the row format of a database table each time (or the first time) the client submits a query involving the table. The timing or manner in which the client is informed of the row format is not limited in any embodiment of the invention.

During state 202, the client may also inform the server of its ability to process data retrieved from the server (e.g., to convert a data type, apply business logic).

In state 204, the server (e.g., a server interface) receives a data request from the client. Illustratively, the request may comprise a SELECT statement identifying one or more rows of a database table and one or more columns within those rows.

In state 206, the server determines whether the amount of columnar data selected for the table meets a threshold, based on the number of columns or the size of the columns. An illustrative threshold is 80%. If the selected amount of data is less than the threshold, the method advances to state 220.

In state 208, the server attempts to determine a level of complexity needed for post-processing of the requested data. Post-processing comprises various processing that may be applied to retrieved data to convert a data type, format a column's data, retrieve related data from another table, apply some business logic, etc.

Different clients or data requesters may be capable of different levels of processing. If the level of complexity required for post-processing exceeds what the server knows or believes the present client is capable of, then the post-processing may be done on the server, not the client. In this case, the illustrated method advances to state 220. Otherwise, the client is deemed capable of performing any necessary post-processing, and the method continues with state 210.

In state 210, the server retrieves the requested rows from storage (e.g., cache, disk), in the format (e.g., column order) in which they are stored. Thus, a disk block may be retrieved and one or more rows extracted from it. The columns of a row are not reordered to match the client's request format. The server simply identifies each row that meets the data request, and retrieves the entire row.

In state 212, the server transmits each row to the client. Illustratively, each row is transmitted as it was retrieved from storage (i.e., with the columns in the same order in which they were stored), and without disassembling or performing post-processing. In an alternative embodiment of the invention, the server may only retrieve or send those columns that are requested, rather then sending the entire contents of each row.

The client receives one row at a time and disassembles them as necessary to retrieve the columns. Unneeded columns may be discarded, and the others are reordered and post-processed as necessary before being consumed. The method then ends.

In state 220, the server retrieves the requested data, disassembles rows to retrieve, reorder and post-process columns, then transmits the requested columns of each requested row, in the order requested by the client. The method then ends.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

For example, in a tightly coupled or clustered environment, an embodiment of the invention may be applied as a means for moving data between nodes. Thus, if a first node is relatively busy compared to a second node, data may be transmitted from the first node to the second node as described above, so that post-processing of the data can be performed on the second node instead of the first.

What is claimed is:

1. A computer-implemented method of efficiently transmitting a result set in response to a data request, the method comprising:
    at a data server, receiving a data request from a requestor, wherein the data request requests less than all columns of a set of rows of a data table;
    determining whether the number of columns in said less than all columns is greater than a threshold percentage of all columns in the data table;
    informing the requester of the storage format of rows of the data table; and
    if the number of columns in said less than all columns is greater than the threshold percentage of all columns, for each row in the set of rows:
        retrieving all columns of the row, as stored in the storage format; and
        without disassembling the row into columns, transmitting the row to the requestor.

2. The method of claim 1, further comprising:
    determining a level of complexity required to post-process the set of rows; and
    if said level of complexity is greater than the requestor is capable of performing, post-processing the set of rows on the data server.

3. The method of claim 1, further comprising:
    if the requestor is capable of performing the post-processing, post-processing the set of rows on the requestor.

4. The method of claim 3, wherein post-processing the set of rows comprises disassembling, into columns, each row in the set of rows.

5. The method of claim 4, wherein said post-processing further comprises:
    converting a datatype of a column.

6. The method of claim 4, wherein said post-processing further comprises:
    retrieving data related to a column.

7. The method of claim 4, wherein said post-processing further comprises:
    applying a set of processor executable instructions to manipulate a column.

8. A computer readable medium storing instructions that, when executed by a computer, cause the computer to perform a method of efficiently transmitting a result set in response to a data request, the method comprising:
    at a data server, receiving a data request from a requestor, wherein the data request requests less than all columns of a set of rows of a data table;
    determining whether the number of columns in said less than all columns is greater than a threshold percentage of all columns in the data table;
    informing the requestor of the storage format of rows of the data table; and
    if the number of columns in said less than all columns is greater than the threshold percentage of all columns, for each row in the set of rows:
        retrieving all columns of the row, as stored in the storage format; and
        without disassembling the row into columns, transmitting the row to the requestor.

9. The computer readable medium of claim 8, wherein the method further comprises:
    determining a level of complexity required to post-process the set of rows; and
    if said level of complexity is greater than the requestor is capable of performing, post-processing the set of rows on the data server.

10. The computer readable medium of claim 9, wherein the method further comprises:
    post-processing the set of rows on the requestor.

11. A computer-implemented method of transmitting requested data from a data server, the method comprising:
    receiving a data request from a requestor, said request targeting a subset of the fields of a set of records in a data table;
    informing the requestor of the storage format of a record of the data table;
    determining whether the subset of fields comprises a threshold percentage of all fields in the data table;
    identifying any post-processing to be performed on the subset of fields;
    for each record in the set of records, retrieving the entire record; and
    transmitting the set of records to the requester without:
        disassembling any record into the fields of the record; or
        performing the identified post-processing.

12. The method of claim 11, wherein the post-processing comprises one or more of:

converting a datatype of a column;
retrieving data related to a column, from a source other than the data table;
applying a set of data manipulation instructions to a column; and
formatting a column.

13. The method of claim 11, further comprising:
performing the post-processing on the requestor.

14. A computer readable storage medium storing instructions that, when executed by a computer, cause the computer to perform a method of transmitting requested data from a data server, the method comprising:
receiving a data request from a requestor, said request targeting a subset of the fields of a set of records in a data table;
informing the requestor of the storage format of a record of the data table;
determining whether the subset of fields comprises a threshold percentage of all fields in the data table;
identifying any post-processing to be performed on the subset of fields;
for each record in the set of records, retrieving the entire record; and
transmitting the set of records to the requestor without:
disassembling any record into the fields of the record; or
performing the identified post-processing.

15. A computer-implemented method of efficiently transmitting a result set in response to a data request, the method comprising:
at a data server, receiving a data request from a requestor, wherein the data request requests less than all columns of a set of rows of a data table;
determining whether the total data size of said less than all columns is greater than a threshold percentage of the total data size of all columns of the data table;
informing the requestor of the storage format of rows of the data table; and
if the total data size of said less than all columns is greater than the threshold percentage of the total data size, for each row in the set of rows:
retrieving all columns of the row, as stored in the storage format; and
without disassembling the row into columns, transmitting the row to the requestor.

16. The method of claim 15, further comprising:
determining a level of complexity required to post-process the set of rows; and
if said level of complexity is greater than the requestor is capable of performing, post-processing the set of rows on the data server.

17. A computer readable storage medium storing instructions that, when executed by a computer, cause the computer to perform a method of efficiently transmitting a result set in response to a data request, the method comprising:
at a data server, receiving a data request from a requestor, wherein the data request requests less than all columns of a set of rows of a data table;
determining whether the total data size of said less than all columns is greater than a threshold percentage of the total data size of all columns of the data table;
informing the requestor of the storage format of rows of the data table; and
if the total data size of said less than all columns is greater than the threshold percentage of the total data size, for each row in the set of rows:
retrieving all columns of the row, as stored in the storage format; and
without disassembling the row into columns, transmitting the row to the requestor.

18. A computer-implemented method of efficiently transmitting a result set in response to a data request, the method comprising:
informing a data requestor of the storage format of rows of a data table;
at a data server, receiving a data request from the requestor, wherein the data request requests less than all columns of a set of rows of the data table;
determining a level of complexity required to post-process the less than all columns of the set of rows;
if said level of complexity is not greater than the requestor is capable of performing, for each row in the set of rows:
retrieving all columns of the row, as stored in the storage format; and
without disassembling the row into columns, transmitting the row to the requestor; and
if said level of complexity is greater than the requestor is capable of performing:
retrieving the set of rows;
post-processing the set of rows on the data server; and
transmitting the post-processed set of rows to the requestor.

19. The method of claim 18, further comprising: determining whether the less than all columns comprise a threshold portion of a row of the data table.

20. The method of claim 19, wherein said threshold portion comprises a percentage of the total number of columns in the row.

21. The method of claim 19, wherein said threshold portion comprises a percentage of the total amount of data in the row.

22. A computer readable storage medium storing instructions that, when executed by a computer, cause the computer to perform a method of efficiently transmitting a result set in response to a data request, the method comprising:
informing a data requestor of the storage format of rows of a data table;
at a data server, receiving a data request from the requestor, wherein the data request requests less than all columns of a set of rows of the data table;
determining a level of complexity required to post-process the less than all columns of the set of rows;
if said level of complexity is not greater than the requestor is capable of performing, for each row in the set of rows:
retrieving all columns of the row, as stored in the storage format; and
without disassembling the row into columns, transmitting the row to the requestor; and
if said level of complexity is greater than the requestor is capable of performing:
retrieving the set of rows;
post-processing the set of rows on the data server; and
transmitting the post-processed set of rows to the requestor.

* * * * *

UNITED STATES PATENT AND TRADEMARK OFFICE
CERTIFICATE OF CORRECTION

PATENT NO. : 7,188,102 B1
APPLICATION NO. : 10/658724
DATED : March 6, 2007
INVENTOR(S) : Sreenivas Gollapudi et al.

It is certified that error appears in the above-identified patent and that said Letters Patent is hereby corrected as shown below:

In claim 1 (at column 5, line 56), please delete the word "requester" and replace it with the word --requestor--.

In claim 11 (at column 6, line 62), please delete the word "requester" and replace it with the word --requestor--.

In claim 19 (at column 8, line 30), please begin a new paragraph after "further comprising:" and before "determining whether the less than all columns ...".

Signed and Sealed this

Fifteenth Day of May, 2007

JON W. DUDAS
*Director of the United States Patent and Trademark Office*